(12) United States Patent
Sabol et al.

(10) Patent No.: US 7,531,611 B2
(45) Date of Patent: May 12, 2009

(54) COPOLYMERS OF TETRAFLUOROETHYLENE

(75) Inventors: Edward A. Sabol, Newark, DE (US); Richard L. Baillie, Newark, DE (US)

(73) Assignee: Gore Enterprise Holdings, Inc., Newark, DE (US)

( * ) Notice: Subject to any disclaimer, the term of this patent is extended or adjusted under 35 U.S.C. 154(b) by 253 days.

(21) Appl. No.: 11/174,882

(22) Filed: Jul. 5, 2005

(65) Prior Publication Data

US 2007/0010642 A1 Jan. 11, 2007

(51) Int. Cl.
C08F 214/26 (2006.01)

(52) U.S. Cl. ............... 526/250; 526/242; 526/247; 526/253; 428/502

(58) Field of Classification Search ............. 526/250, 526/242, 253, 247; 428/502
See application file for complete search history.

(56) References Cited

U.S. PATENT DOCUMENTS

| | | | |
|---|---|---|---|
| 3,142,665 A | 7/1964 | Cardinal | |
| 3,391,099 A | 7/1968 | Punderson | |
| 3,953,566 A | 4/1976 | Gore | |
| 4,016,345 A | 4/1977 | Holmes | |
| 4,078,134 A | 3/1978 | Kuhls | |
| 4,078,135 A | 3/1978 | Sulzbach | |
| 4,187,390 A | 2/1980 | Gore | |
| 4,576,869 A * | 3/1986 | Malhotra | 428/502 |
| 4,636,549 A | 1/1987 | Gangal | |
| 4,640,955 A | 2/1987 | Malhotra | |
| 4,792,594 A | 12/1988 | Gangal | |
| 5,506,281 A * | 4/1996 | Muhlbauer | 523/201 |
| 5,731,394 A * | 3/1998 | Treat et al. | 526/247 |
| 6,011,113 A | 1/2000 | Konabe | |
| 6,177,533 B1 | 1/2001 | Woodward | |
| 6,541,589 B1 | 4/2003 | Baillie | |
| 6,589,597 B1 * | 7/2003 | Ono et al. | 427/195 |

FOREIGN PATENT DOCUMENTS

| | | |
|---|---|---|
| JP | A9 359779 | 9/1999 |
| WO | WO 03/033555 | 4/2003 |
| WO | WO 2004/056887 | 7/2004 |

* cited by examiner

Primary Examiner—Peter D. Mulcahy
Assistant Examiner—Henry Hu
(74) Attorney, Agent, or Firm—E. Alan Uebler, P.A.

(57) ABSTRACT

A polymerization process for producing a tetrafluoroethylene copolymer, and the copolymer produced thereby, are provided. The copolymer is of the dispersion/fine powder type and contains polymerized tetrafluoroethylene monomer units and co-polymerized higher homologous comonomer units having the formula $(C_nF_{(2n+1)})CH=CH_2$, wherein $6 \leq n < 10$, in which the primary particles are believed to have a core and shell structure and the polymerized comonomer units are present in an amount from 0.01 mol % to 0.3 mol %, based upon total copolymer composition. The copolymer has a raw dispersion primary particle size (RDPS) of less than 0.210 microns coupled with a standard specific gravity (SSG) of less than 2.143. Preferably the copolymer has comonomer units present in an amount from 0.05 mol % and 0.25 mol % and the RDPS is within the range between 0.178 microns and 0.200 microns, coupled with a SSG of less than 2.140. Copolymers produced according to the invention, (perfluorohexyl)ethylene (PFHE) and (perfluorooctyl)ethylene (PFOE), may be shaped into the form of 0.1 inch diameter expanded beading, which expanded beading can have a break strength of at least 10.0 lbs, and which may exceed 13.0 lbs.

13 Claims, No Drawings

COPOLYMERS OF TETRAFLUOROETHYLENE

BACKGROUND OF THE INVENTION

The invention relates to copolymers of tetrafluoroethylene copolymerized with (perfluorohexyl)ethylene and higher homologs, produced by aqueous dispersion polymerization.

Many prior patents disclose techniques for the dispersion polymerization of tetrafluoroethylene, and variations thereof. The dispersion polymerization of tetrafluoroethylene produces what has come to be known as "fine powder" resins. In such a process, sufficient dispersing agent is introduced into a water carrier such that, upon addition of tetrafluoroethylene in the presence of a suitable polymerization initiator and upon agitation, and under autogenous tetrafluoroethylene pressure of 10 to 40 $kg/cm^2$, the polymerization proceeds until the target level of colloidally dispersed polymer particles is reached and the reaction is then stopped. See, e.g., U.S. Pat. No. 4,016,345 (Holmes, 1977).

Tetrafluoroethylene powders have also been produced by an alternative process of suspension polymerization, wherein tetrafluoroethylene monomers are polymerized in a highly agitated aqueous suspension in which little or no dispersing agent may be employed. The type of powder produced in suspension polymerization is termed "granular" resin, or "granular powder". See, e.g., U.S. Pat. No. 3,655,611 (Mueller, 1972).

For both types of polymerization processes, copolymerization of tetrafluoroethylene with various fluorinated alkyl ethylene comonomers has been described. See, for example, U.S. Pat. No. 4,792,594 (Gangal, et al., 1988). The present invention relates to the aqueous dispersion polymerization technique wherein the product of the polymerization reaction is the copolymer of the invention dispersed within an aqueous colloidal dispersion. This process, generally, is one in which tetrafluoroethylene monomer is pressured into an autoclave containing water and certain polymerization initiators, along with paraffin wax to suppress coagulum formation, and an emulsifying agent. The reaction mixture is agitated and the polymerization is carried out at suitable temperatures and pressures. Polymerization results in the formation of an aqueous dispersion of polymer. The dispersed polymer particles may be coagulated by techniques known in the art to produce the polymer in the form of fine powder. When perfluorinated alkyl ethylene comonomers are introduced into the polymerization, it is known that the TFE reacts preferentially with the comonomer relative to TFE, and comonomer addition rate is important to the distribution of comonomer achieved in the copolymer. When this comonomer is added as a single precharge, the comonomer is found in polymerized form mostly in the core or interior of the polymer particles. The comonomer may also be injected through some or all of the polymerization process, and the injection sequence determines the structure of the shell.

Various prior patents have disclosed variations on techniques for the homopolymerization of tetrafluoroethylene and for the copolymerization of other monomers with tetrafluoroethylene. Among those are included U.S. Pat. No. 4,576,869 (Malhotra, 1986) and U.S. Pat. No. 6,177,533B1 (Jones, 2001). Within those references are contained certain procedures which have become, more or less, accepted procedures for determining certain defining and delineating properties associated with tetrafluoroethylene homopolymers and copolymers. Among those properties are:

(a) the Standard Specific Gravity (SSG), measured by water displacement of a standard molded test specimen, in accord with ASTM D-1457-90;

(b) the Raw Dispersion Particle Size (RDPS), determined by spectrophotometry or other suitable technique. See, e.g., U.S. Pat. Nos. 4,016,345 and 4,363,900. The measurements herein were obtained by laser light scattering using a Brookhaven 90 plus instrument;

(c) Resin surface area. The surface area of the dry coagulated resin is inversely related to RDPS. The measurements herein were obtained using a Coulter model SA3100 surface area analyzer using the BET method and Nitrogen as the absorbed gas.

In the cited prior patents, and almost universally, the SSG of a homopolymer specimen has come to define its molecular weight, with the relationship being inverse, that is, a high molecular weight (MW) corresponds to a low SSG and, generally, the lower the SSG, the higher is the molecular weight. Addition of comonomer into the polymerization process may also reduce SSG and, for resins modified with comonomer, SSG may be used to infer variations in molecular weight at a given constant comonomer level.

For tetrafluoroethylene fine powder polymers, generally, their RDPS's range from about 0.175 microns and below to about 0.325 microns. These fine powder resins are known to be useful in paste extrusion processes and in stretching (expansion) processes in which the paste-extruded extrudate, after removal of the extrusion aid lubricant, is stretched rapidly to produce porous, strong products of various cross-sectional shapes such as rods, filaments, sheets, tubes, etc. Such a stretching process is disclosed in U.S. Pat. No. 3,953,566 (Gore, 1976), assigned commonly with the instant invention. Products produced by this process are marketed under the well-known trademark GORE-TEX®.

Copolymers of tetrafluoroethylene and (perfluorobutyl)ethylene are disclosed in U.S. Pat. No. 6,541,589B1, also commonly assigned with the present invention. Therein, a copolymerization process and the products produced thereby are disclosed, including a PFBE copolymer which possesses small particle size coupled with high molecular weight, wherein the initiation of polymerization is by addition of permanganate, and the reaction is carried out in the absence of any ionic strength enhancer such as $ZnCl_2$.

Still further, others have previously investigated the copolymerization of TFE with PFBE and higher homologs, and reported on the polymers produced thereby. For example, Kamiya (Japanese Patent Application 10-243976, filed August 28, 1998) discloses tetrafluoroethylene fine powder copolymers with (perfluoroethyl)ethylene (PFEE), (perfluorobutyl)ethylene (PFBE), and (perfluorooctyl)ethylene, with a stated objective including the manufacture of uniform, high-strength porous articles by stretching. Among others, the patentee concluded that, among these comonomers, the (perfluorobutyl)ethylene (PFBE) was preferred.

Prior to the discovery disclosed and claimed in the '589 patent, it was generally accepted that, for tetrafluoroethylene homopolymers and copolymers of the dispersion type, it was difficult to achieve a resin which combined both of the desirable properties of small particle size (RDPS) coupled with a high molecular weight (MW) (low SSG). Expressing the same conclusion in a different, equivalent way, it was generally accepted that a dispersion resin possessing a small raw dispersion particle size (RDPS) and a low standard specific gravity (SSG) was difficult or impossible to achieve. And seemingly small variations in SSG values, i.e. 2.160 to 2.157, reportedly produced significant variations in polymer properties. See, e.g., Jones, U.S. Pat. No. 6,177,533, wherein patentee specifically claims distinct embodiments wherein SSG values vary by 0.003 units. Moreover, the '589 patent, directed as it is to copolymers of TFE and PFBE, provided a breakthrough in achieving the oft-sought combination of small particle size and high molecular weight, namely, particle size below 0.203 micron and SSG of less than 2.143.

The present invention provides a dispersion type copolymer of tetrafluoroethylene and (perfluorohexyl) ethylene and higher homologous comonomers which possess a heretofore unachieved combination of both small fundamental resin particle size (RDPS) coupled with a low SSG (high MW). In addition, the new copolymers of the invention provide expanded products having extremely high, heretofore unachievable, tensile strength properties.

SUMMARY OF THE INVENTION

A polymerization process for producing a tetrafluoroethylene copolymer, and the copolymer produced thereby, are provided. The copolymer is of the dispersion/fine powder type and contains polymerized tetrafluoroethylene monomer units and co-polymerized higher homologous comonomer units having the formula $(C_nF_{(2n+1)})CH=CH_2$, wherein $6 \leq n < 10$, in which the primary particles are believed to have a core and shell structure and the polymerized comonomer units are present in an amount from 0.01 mol % to 0.3 mol %, based upon total copolymer composition. The copolymer has a raw dispersion primary particle size (RDPS) of less than 0.210 microns coupled with a standard specific gravity (SSG) of less than 2.143. Preferably the copolymer has comonomer units present in an amount from 0.05 mol % and 0.25 mol % and the RDPS is within the range between 0.178 microns and 0.200 microns, coupled with a SSG of less than 2.140. As polymerized, the copolymer is dispersed within an aqueous dispersion which, on coagulation and drying, may be converted into the form of fine powder.

The preferred copolymers produced according to the invention are (perfluorohexyl)ethylene (PFHE) and (perfluorooctyl)ethylene (PFOE), wherein said comonomer units are present in an amount from 0.05 mol % to 0.25 mol % and wherein RDPS is less than 0.200 microns in combination with a SSG of less than 2.140. The copolymers of the invention may be shaped into the form of 0.1 inch diameter expanded beading, which expanded beading has a break strength of at least 10.0 lbs, and which may exceed 13.0 lbs.

The copolymers of this invention, when shaped into a 0.1 inch diameter expanded beading, all have a strength generation ratio (SGR) (as defined herein) exceeding $2.0 \times 10^{-2} cm^2$, and a copolymer having a SGR of at least 3.0 is now possible. For a copolymer of this invention which has never been heated above its crystalline melt point, in the form of an expanded, porous, shaped article, the article can have a matrix tensile strength in at least one direction above about 35.0 kpsi, and an expanded, porous, shaped article can be produced having a matrix tensile strength in at least one direction above about 45.0 kpsi.

Most preferred is a tetrafluoroethylene copolymer of the fine powder type containing polymerized tetrafluoroethylene monomer units and copolymerized comonomer units having the formula

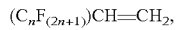

wherein n=8 and wherein (a) a copolymerized comonomer units are present in an amount from 0.05 mol % to 0.25 mol % based upon total copolymer composition, (b) the copolymer has a raw dispersion primary particle size (RDPS) less than 0.200 microns and has a standard specific gravity (SSG) of less than 2.140, (c) the copolymer, shaped into the form of 0.1 inch diameter expanded beading, has a break strength exceeding 13.0 lbs., (d) the copolymer has a strength generation ratio (SGR) exceeding $2.0 \times 10^{-2} cm^2$., and (e) in the form of an expanded, porous, shaped article, the article has a matrix tensile strength in at least one direction above about 40 kpsi.

The process of the invention is characterized in that the copolymerization reaction is catalyzed by potassium permanganate initiator and the entire reaction is carried out in the absence of any multivalent ionic strength enhancer, such as zinc chloride. The addition of initiator is stopped well before completion of the reaction, preferably at or before the midpoint of the complete reaction. Also, and preferably, the comonomer is added as a precharge into the copolymerization reactor, although it may be added incrementally and intermittently through a portion of the polymerization reaction process.

DETAILED DESCRIPTION OF THE INVENTION AND PREFERRED EMBODIMENTS

A polymerization process for producing a tetrafluoroethylene copolymer, and the copolymer produced thereby, are provided. The copolymer is of the dispersion/fine powder type and contains polymerized tetrafluoroethylene monomer units and co-polymerized higher homologous comonomer units having the formula $(C_nF_{(2n+1)})CH=CH_2$, wherein $6 \leq n < 10$, in which the primary particles are believed to have a core and shell structure and the polymerized comonomer units are present in an amount from 0.01 mol % to 0.3 mol %, based upon total copolymer composition. The copolymer has a raw dispersion primary particle size (RDPS) of less than 0.210 microns coupled with a standard specific gravity (SSG) of less than 2.143. Preferably the copolymer has comonomer units present in an amount from 0.05 mol % and 0.25 mol % and the RDPS is within the range between 0.178 microns and 0.200 microns, coupled with a SSG of less than 2.140. Copolymers produced according to the invention, (perfluorohexyl)ethylene (PFHE) and (perfluorooctyl)ethylene (PFOE), may be shaped into the form of 0.1 inch diameter expanded beading, which expanded beading can have a break strength of at least 10.0 lbs, and which may exceed 13.0 lbs.

The co-polymers of this invention provide the heretofore unachieved combination of properties wherein, for these specific polymers, their fundamental particle size is very small and, simultaneously, this is coupled with a high molecular weight. These polymers are produced by a dispersion polymerization process, which is described in detail below and in the examples which follow. It can be seen from the examples, and drawing upon basic principles of dispersion polymerization of tetrafluoroethylene monomers, in particular, certain processing steps disclosed herein are critical. These steps specifically include:

Initiation of Polymerization

The copolymer of this invention is produced by a polymerization process wherein the copolymerization reaction is catalyzed by a permanganate initiator, preferably potassium permanganate $KMnO_4$, in the absence of any multivalent ionic strength enhancer, and the initiator addition is stopped completely, allowing the reaction to slow down and proceed to completion, at a point between 30% and 80% of the progression of the reaction toward completion. Preferably the initiator addition is stopped at about one-third of the way to the reaction completion, i.e., at 30-45% to completion.

The perfluorobutylethylene comonomer is preferably added as a precharge in the reaction or, alternatively, it can be added incrementally through only a portion of the reaction.

Use of Dispersing Agents

Substantially non-telogenic dispersing agents are used. Ammonium perfluoro octanoic acid (APFO, or "C-8" ) is an acceptable dispersing agent. Programmed addition (precharge and pumping) is known and is preferred. Decreasing the precharge can lead to increased primary particle size.

Polymerization Control

It is known that ionic strength affects primary particle size control and dispersion stability. Care must be taken to have a sufficiently stable dispersion to enable completion of the polymerization without coagulating the dispersion and to have a sufficiently stable dispersion to survive transportation from the polymerization vessel to the coagulator. Inorganic salts have been precharged into the polymerization reactor with the intended effect of increasing the primary particle size. Multivalent ions, generally, are more effective in increasing ionic strength. Zinc chloride has been employed, together with decreased APFO, intended to control (increase) the primary particle size. In the polymerization reaction of the present invention, however, multivalent ionic strength enhancers, such as zinc chloride, are omitted from the reaction.

It is known that particular attention must be paid to ingredient purity to achieve the desired properties in polymerizations as described herein. Ionic impurities, which can also increase ionic strength, in addition to soluble organic impurities, which can cause chain transfer or termination, must be minimized. It is clearly important to employ ultra pure water in all such polymerization reactions, and ultrapure monomers.

Additional Test Procedures

The break strength associated with an extruded and expanded (stretched) beading produced from a particular resin is directly related to that resin's general suitability for expansion, and various methods have been employed to measure break strength. The following procedure was used to produce and test expanded beading made from the copolymers of this invention:

For a given resin, blend 113.4 g. of fine powder resin together with 32.5 ml. of Isopar® K. Age the blend for about 2 hours at 22° C. in a constant temperature environmental chamber. Make a 1 in. diameter cylindrical preform by applying about 270 psig of preforming pressure for about 20 seconds. Inspect the preform to insure it is crack free. Produce an extruded beading by extruding the preformed lubricated resin through a 0.100 in. diameter die having a 30 degree included inlet angle. The extruder barrel is 1 in. in diameter and the ram rate of movement is 20 in./min. The extruder barrel and die are at room temperature, maintained at 23° C., plus or minus 1.5° C. Remove the Isopar K from the beading by drying it for about 25 minutes at 230° C. Discard approximately the first and last 8 ft. of the extruded beading to eliminate end effects. Expand a 2.0 in. section of the extruded beading by stretching at 290° C. to a final length of 50 in. (expansion ratio of 25:1) and at an initial rate of stretch of 100% per second, which is a constant rate of 2 in. per second. Remove about a 1 ft. length from near the center of the expanded beading. The break strength is, by definition, the highest load measured during the tensile test, measured at room temperature (23° C. plus or minus 1.5° C.) using an Instron® tensile tester using an initial sample length of 2 in. and a crosshead speed of 12 in./min. Measure in duplicate and report the average value for the two samples. This procedure is similar to that described in U.S. Pat. No. 6,177,533B1. The expansion here is carried out at 290° C. instead of 300° C.

A Defining Parameter

The strength characteristics of various grades of resin can be compared by measuring the relative increase in the strength of the polymer matrix from the unexpanded extrudate to the expanded beading, this increase resulting from the expansion process. One measure of this increase in strength is the Strength Generation Ratio ("SGR"), which is defined herein as the ratio of the break strength of the expanded bead for the 0.100 inch diameter beading discussed above, to the extrusion pressure, in appropriate units, e.g., $cm^2 \times 10^{-2}$. Provided that the extrusion temperature, tooling dimensions, lubricant level, etc. are specified for this test, generally the break strength of the extruded beading increases linearly with increasing extrusion pressure. Therefore, the extrusion pressure can provide an accurate measure which directly relates to extrudate strength. Similarly, the matrix tensile strength (MTS) generally increases in proportion to bead break load. The expanded beading break load provides a more precise indication of polymer "strength" as compared with the calculated matrix tensile strength. The matrix tensile strength of porous PTFE samples is determined by multiplying the break strength by the ratio of the specific gravity of the solid polymer to that of the porous, expanded beading, where 2.2 is taken as the specific gravity of the non-porous PTFE. The SGR provides an indication of the relative increase in a polymer's strength as a result of the expansion process. In the examples which follow, both SGR and MTS are reported for the resins claimed according to this invention.

Mole Fraction to Weight Fraction Conversion

In the prior U.S. Pat. No. 6,541,589, discussed hereinabove, the fractions of polymerized comonomer units are presented as weight fractions. For ready comparison with the mole fractions presented herein, the formula for converting to weight fraction from mole fraction is given by:

$$w_m = \frac{x_m M_m}{x_m M_m + (1 - x_m) M_{TFE}}$$

where $W_m$=weight fraction of modifier (to convert weight fraction to wt. %, multiply by 100)

$x_m$=mole fraction of modifier (to convert mole fraction to mol. %, multiply by 100)

$M_m$=molecular weight of modifier $M_{TFE}$=molecular weight of TFE=100.0 g/mole To calculate mole fraction from weight fraction:

$$w_m = \frac{w_m / M_m}{w_m / M_m + (1 - w_m) / M_{TFE}}$$

For the modifiers of interest herein, the values shown in the following table are to be used:

| Modifier | $M_m$(g/mole) |
|----------|---------------|
| PFBE | 246.1 |
| PFHE | 346.1 |
| PFOE | 446.1 |

For example, to convert 0.5 wt. % PFBE to mol. % PFBE, the following computation, $$x_{PFBE} = \frac{w_{PFBE}/M_{PFBE}}{w_{PFBE}/M_{PFBE} + (1 - w_{PFBE})/M_{TFE}}$$
$$= \frac{0.005/246.1}{0.005/246.1 + (1 - 0.005)/100.0}$$
$$= 0.002,$$

as indicated, produces a mole composition of 0.2 mol % PFBE.

The following examples are intended to illustrate the principles according to this invention and are not to be construed as limitative of the appended claims in any respect. In all of these examples, no ionic strength enhancer was added. Specifically, no $ZnCl_2$ was added in any of the examples described herein.

EXAMPLE 1

To a 50-liter, horizontal polymerization reactor equipped with a 3-bladed agitator was added 1.5 kg. paraffin wax, 28 kg. of de-ionized (DI) water, 90 g. of 20% ammonium perfluorooctanoic acid (APFO) solution and 5 g. of succinic acid dissolved in about 50 grams of deionized water. The reactor and contents were heated above the melting point of the wax. The reactor was repeatedly evacuated and pressurized (to about 1 atmosphere or less) with TFE until the oxygen level was reduced to 20 ppm or less. The contents were briefly agitated between evacuation and purge cycles to ensure that the water was deoxygenated. To the evacuated reactor under vacuum were added 15.47 g of PFHE as a precharge of comonomer, and the reactor was heated to 83° C. The contents of the reactor were then continuously agitated at 60 rpm. TFE was then added to the reactor until the pressure reached 2.9 MPa (absolute). While maintaining a constant pressure inside the reactor by controlling the TFE flow rate, a $KMnO_4$ in DI water solution (0.063 g/L) was injected at 80 ml/min. until about 4.0 kg. of TFE had been added. About 320 ml. of 20% APFO solution were added in 40 ml. increments, the first increment being added after about 1 kg. of TFE had been added to the reactor, and the subsequent increments added after each subsequent kg. of TFE had been added, so that the final increment was added after about 9 kg. of TFE had been charged. The $KMnO_4$ addition rate was decreased to 40 ml./min. at the 4 kg. TFE level and continued at this rate until about 6 kg. TFE had been added at which time the addition of $KMnO_4$, was stopped. A total of 1,835 g of $KMnO_4$ solution was added to the reactor over a period of 27 min. The polymerization reaction was then allowed to continue and the reaction was stopped after about 16 kg. of TFE had been added to the reactor. No $KMnO_4$ was added after 37.5% of the TFE had been reacted. The total reaction time was 167 min.

The weight of the dispersion produced was 47.0 kg. and the dispersion contained 35.2 wt. % solids. The raw dispersion particle size (RDPS) of the polymer particles was 204 nm.

A portion of the dispersion was diluted with DI water, coagulated using nitric acid and dried at 180° C.

The properties of the resultant resin are summarized in Table I.

EXAMPLE 2

The procedures for Example 1 were repeated except that 46.47 g. of PFHE were added as a precharge to the reactor. The $KMnO_4$ was added in increments such that $KMnO_4$ solution (0.1 g/L) was injected at a rate of about 80 ml./min. until 5 kg. TFE had been charged. The rate of $KMnO_4$ addition was reduced to 40 ml./min. until the total amount or TFE reacted reached 6 kg. at which point the $KMnO_4$ addition was stopped. A total of 2635 g. of $KMnO_4$ solution was added to the reactor over a period of 36 min. The polymerization was allowed to continue and the reaction was stopped after about 16 kg. of TFE had been added to the reactor. The total reaction time was 124 min.

The weight of the dispersion produced was 48.3 kg. and the dispersion contained 35.2 wt. % solids. The raw dispersion particle size (RDPS) of the polymer particles was 180 nm.

The properties of the resultant resin are summarized in Table I.

EXAMPLE 3

The procedures followed for Example 1 were repeated except that 92.82 g. of PFHE were added as a precharge to the reactor. The $KMnO_4$ solution (0.1 g./L) was injected continuously into the reactor at a constant rate until the total amount of TFE reacted reached 6 kg., at which point the $KMnO_4$ addition was stopped. A total of 5980 g. of $KMnO_4$ solution was added to the reactor over a period of 87 min. The polymerization was allowed to continue and the reaction was stopped after about 16 kg. of PTFE had been added to the reactor. The total reaction time was 196 min.

The weight of the dispersion produced was 52.0 kg. and the dispersion contained 34.5 wt. % solids. The raw dispersion particle size (RDPS) of the polymer particles was 167 nm.

The properties of the resultant resin are summarized in Table I.

EXAMPLE 4

The procedures for Example 1 were repeated except that 19.94 g. of (perfluorooctyl)ethylene (PFOE) were added as a precharge to the reactor. The $KMnO_4$ was added in increments such that $KMnO_4$ solution was injected at a rate of 80 ml./min. until 3 kg. TFE had been charged. The rate of $KMnO_4$ addition was reduced to 40 ml./min. until the total amount or TFE reacted reached 6 kg. at which point the $KMnO_4$ addition was stopped. A total of 2535 g. of KMnO4 solution was added to the reactor over a period of 37 min. The polymerization was allowed to continue and the reaction was stopped after about 16 kg. of TFE had been added to the reactor. The total reaction time was 197 min.

The weight of the dispersion produced was 48.2 kg. and the dispersion contained 35.5 wt. % solids. The raw dispersion particle size (RDPS) of the polymer particles was 209 nm.

The properties of the resultant resin are summarized in Table I.

EXAMPLE 5

The procedures for Example 1 were repeated except that 59.82 g. of PFOE were added as a precharge to the reactor.

The KMnO₄ solution was injected continuously into the reactor at a constant rate until the total amount of TFE reacted reached 6 kg. at which point the KMnO₄ addition was stopped. A total of 2555 g. of KMnO₄ solution was added to the reactor over a period of 34 min. The polymerization was allowed to continue and the reaction was stopped after about 16 kg. of TFE had been added to the reactor. The total reaction time was 205 min.

The weight of the dispersion produced was 47.3 kg. and the dispersion contained 35.2 wt. % solids. The raw dispersion particle size (RDPS) of the polymer particles was 181 nm.

The properties of the resultant resin are summarized in Table I.

EXAMPLE 6

The procedures for Example 1 were repeated except that 119.64 g. of PFOE were added as a precharge to the reactor. The KMnO₄ solution (0.15 g/L) was injected continuously into the reactor at a constant rate until the total amount of TFE reacted reached 6 kg. at which point the KMnO₄ addition was stopped. A total of 3025 g. of KMnO₄ solution was added to the reactor over a period of 40 min. The polymerization was allowed to continue and the reaction was stopped after about 16 kg. of TFE had been added to the reactor. The total reaction time was 226 min.

The weight of the dispersion produced was 48.3 kg. and the dispersion contained 34.9 wt. % solids. The raw dispersion particle size (RDPS) of the polymer particles was 180 nm.

The properties of the resultant resin are summarized in Table I.

COMPARATIVE EXAMPLE A

The procedures for Example 1 were repeated except that 44.00 g. of PFBE were added as a precharge to the reactor. The KMnO₄ was added in increments such that KMnO₄ solution was injected at a rate of 80 ml./min. until 2 kg. TFE had been charged. The rate of KMnO₄ addition was reduced to 40 ml./min. until the total amount of TFE reacted reached 6 kg. at which point the KMnO₄ addition was stopped. A total of 4220 g. of KMnO₄ solution was added to the reactor over a period of 61 min. The polymerization was allowed to continue and the reaction was stopped after about 16 kg. of TFE had been added to the reactor. The total reaction time was 113 min.

The weight of the dispersion produced was 47.5 kg. and the dispersion contained 34.8 wt. % solids. The raw dispersion particle size (RDPS) of the polymer particles was 174 nm.

The properties of the resultant resin are summarized in Table I.

COMPARATIVE EXAMPLE B

The procedures for Example 1 were repeated except that 55.00 g. of PFBE were added as a precharge to the reactor. The KMnO₄ was added in increments such that KMnO₄ solution was injected at a rate of 80 ml./min. until 3 kg. TFE had been charged. The rate of KMnO₄ addition was reduced to 40 ml./min. until the total amount of TFE reacted reached 5 kg. The rate of KMnO₄ addition was reduced to 10 ml./min. until the total amount of TFE reacted reached 6 kg. at which point the KMnO₄ addition was stopped. A total of 4260 g. of KMnO₄ solution was added to the reactor over a period of 70 min. The polymerization was allowed to continue and the reaction was stopped after about 16 kg. of TFE had been added to the reactor. The total reaction time was 112 min.

The weight of the dispersion produced was 48.2 kg. and the dispersion contained 34.4 wt. % solids. The raw dispersion particle size (RDPS) of the polymer particles was 173 nm.

The properties of the resultant resin are summarized in Table I.

EXAMPLE 7

In this example, the amount of copolymer production was scaled up by approximately an order of magnitude (10X). Accordingly, to a 580-liter, horizontal polymerization reactor was added 18 kg. paraffin wax, 350 kg. of de-ionized (DI) water, 1.25 L. of 20% ammonium perfluorooctanoic acid (APEO) solution and 60 g. of succinic acid. The reactor and contents were heated above the melting point of the wax. The reactor was repeatedly evacuated and pressurized (to about 1 atmosphere or less) with TFE until the oxygen level was reduced to 20 ppm or less. The contents were briefly agitated between evacuation and purge cycles to ensure that the water was deoxygenated. To the evacuated reactor under vacuum were added 673 g of PEOE as a precharge of comonomer, and the reactor was heated to 83° C. The contents of the reactor were then continuously agitated at 27 rpm. TFE was then added to the reactor until the pressure reached 2.9 MPa (absolute). While maintaining a constant pressure inside the reactor by controlling the TFE flow rate, KMnO₄ in DI water solution (0.30 g/L) was injected at 150 ml/min. As the reaction proceeded, the flow rate of KMnO₄ solution was reduced in order to maintain a constant reaction rate of TFE of about 1.2 kg./min. Once 60 kg. of TFE had reacted, the flowrate of KMnO₄ solution was stopped. A total of 5.98 kg. of KMnO₄ solution was added to the reactor over a period of 104 min. 1.8 kg. of 20% APFO solution was added in 0.6 kg. increment, the first increment being added after about 24 kg. of TFE had been added to the reactor, and the subsequent increments added after each subsequent 12 kg. of TFE had been added, so that the final increment was added after about 48 kg. of TEE had been charged. The polymerization reaction was then allowed to continue and the reaction was stopped after about 180 kg. of TFE had been added to the reactor. No KMnO₄ was added after 33.3% of the TFE had been reacted. The total reaction time was 277 min.

The weight of the dispersion produced was 555 kg. and the dispersion contained 34.9 wt. % solids. The raw dispersion particle size (RDPS) of the polymer particles was 191 nm.

A portion of the dispersion was diluted with DI water, coagulated using nitric acid and dried at 180° C.

The properties of the resultant resin are summarized in Table II.

COMPARATIVE EXAMPLE C

The procedures for Example 7 were repeated except that 420 g. of PFBE were added as a precharge to the reactor. The KMnO₄ solution was added such the rate of TFE reacted was controlled at about 1.9 kg./min. A total of 4.97 kg. of KMnO₄ solution was added to the reactor over a period of 91 min. 2.4 kg. of 20% APFO solution was added in 0.48 kg. increment, the first increment being added after about 12 kg. of TFE had been added to the reactor, and the subsequent increments added after each subsequent 12 kg. of TFE had been added, so that the final increment was added after about 60 kg. of TFE had been charged. The polymerization was allowed to continue and the reaction was stopped after about 180 kg. of TFE had been added to the reactor. The total reaction time was 182 min.

The weight of the dispersion produced was 540 kg. and the dispersion contained 34.2 wt. % solids. The raw dispersion particle size (RDPS) of the polymer particles was 210 nm.

The properties of the resultant resin are summarized in Table II.

While the invention has been disclosed herein in connection with certain embodiments and detailed descriptions, it will be clear to one skilled in the art that modifications or variations of such details can be made without deviating from the gist of this invention, and such modifications or variations are considered to be within the scope of the claims hereinbelow.

TABLE I

| | Modifier | Calculated Modifier conc. (mol %) | Measured Modifier conc. (mol %)* | RDPS (nm) | SSG | Surface Area ($m^2/g$) | Extrusion Pressure ($lb/in^2$) | Break Load (lb) | SGR ($cm^2 \times 10^{-2}$) | MTS (kpsi) |
|---|---|---|---|---|---|---|---|---|---|---|
| Comparitive Example A | PFBE | 0.112% | 0.079% | 174 | 2.142 | 13.5 | 3407 | 10.4 | 2.0 | 35.0 |
| Comparitive Example B | PFBE | 0.139% | 0.145% | 173 | 2.142 | 13.8 | 3427 | 7.5 | 1.4 | 28.9 |
| Example 1 | PFHE | 0.028% | 0.017% | 204 | 2.137 | 11.9 | 3131 | 10.2 | 2.1 | 37.0 |
| Example 2 | PFHE | 0.084% | 0.081% | 180 | 2.136 | 12.2 | 3348 | 12.2 | 2.4 | 44.8 |
| Example 3 | PFHE | 0.167% | 0.167% | 167 | 2.137 | 14.0 | 3569 | 12.9 | 2.3 | 43.4 |
| Example 4 | PFOE | 0.028% | 0.015% | 209 | 2.142 | 11.3 | 3149 | 9.4 | 1.9 | 32.6 |
| Example 5 | PFOE | 0.084% | 0.060% | 181 | 2.139 | 13.1 | 3392 | 11.4 | 2.2 | 38.0 |
| Example 6 | PFOE | 0.168% | 0.119% | 180 | 2.137 | 13.7 | 3489 | 13.8 | 2.6 | 45.4 |

*Modifier concentration determined using F19 NMR

TABLE II

| | Modifier | Calculated Modifier conc. (mol %) | Measured Modifier conc. (mol %) | RDPS (nm) | SSG | Surface Area ($m^2/g$) | Extrusion Pressure ($lb/in^2$) | Break Load (lb) | SGR ($cm^2 \times 10^{-2}$) | MTS (kpsi) |
|---|---|---|---|---|---|---|---|---|---|---|
| Comparative Example C | PFBE | 0.095% | 0.091% | 210 | 2.137 | 12.3 | 3102 | 10.7 | 2.2 | 38.7 |
| Example 7 | PFOE | 0.084% | 0.083% | 191 | 2.137 | 13.4 | 2775 | 12.9 | 3.0 | 44.6 |

What is claimed is:

1. A process for the copolymerization of a fine powder tetrafluoroethylene copolymer, said copolymer containing essentially from 99.70 mol % to 99.99 mol % tetrafluoroethylene monomer units and from 0.01 mol % to 0.30 mol % copolymerized comonomer units having the formula

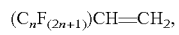

$(C_nF_{(2n+1)})CH{=}CH_2$, wherein 6≦n<10, said process comprising:
(a) copolymerizing said monomer and comonomer in a pressurized reactor,
(b) initiating said copolymerization by adding potassium permanganate ($KMnO_4$),
(c) carrying out the entire reaction in the absence of any ionic strength enhancer, and
(d) stopping the addition of ($KMnO_4$) initiator at a point in the reaction no further than 80% of the reaction completion wherein
said polymerized comonomer units are present in an amount from 0.01 mol % to 0.30 mol % based upon total copolymer composition, and
said copolymer has a raw dispersion primary particle size (RDPS) less than 0.210 microns and has a standard specific gravity (SSG) of less than 2.143.

2. The process of claim 1 wherein said comonomer is (perfluorohexyl)ethylene (PFHE).

3. The process of claim 1 wherein said comonomer is (perfluorooctyl)ethylene (PFOE).

4. The process of claim 1 including adding said comonomer as a precharge in the copolymerization reaction.

5. The process of claim 1 including adding the comonomer incrementally and intermittently, from the beginning of the reaction through only a portion of the complete reaction.

6. The process of claim 1 including stopping the addition of $KMnO_4$ initiator at a point in the reaction no further than 60% of the reaction completion.

7. The process of claim 1 including stopping the addition of $KMnO_4$ initiator at a point in the reaction no further than 50% of the reaction completion.

8. The process of claim 1 for the copolymerization of a tetrafluoroethylene copolymer of the dispersion/fine powder type, wherein:
said polymerized comonomer units are present in an amount from 0.01 mol% to 0.30 mol% based upon total copolymer composition, and
said copolymer has a raw dispersion primary particle size (RDPS) less than 0.210 microns and has a standard specific gravity (SSG) of less than 2.143.

9. The process of claim 1 wherein said copolymer has a RDPS less than 0.200 microns and has a SSG of less than 2.140.

10. The process of claim 1 including adding the comonomer as a precharge in the copolymerization reaction.

11. The process of claim 1 including adding the comonomer incrementally and intermittently, from the beginning of the reaction through only a portion of the complete reaction.

12. The process of claim 1 including stopping the addition of $KMnO_4$ initiator at a point in the reaction no further than 60% of the reaction completion.

13. The process of claim 1 including stopping the addition of $KMnO_4$ initiator at a point in the reaction no further than 50% of the reaction completion.

* * * * *

UNITED STATES PATENT AND TRADEMARK OFFICE
CERTIFICATE OF CORRECTION

PATENT NO. : 7,531,611 B2
APPLICATION NO. : 11/174882
DATED : May 12, 2009
INVENTOR(S) : Edward A. Sabol and Richard L. Baillie It is certified that error appears in the above-identified patent and that said Letters Patent is hereby corrected as shown below:

Column 6, line 52, the term "$W_m$" should read --$w_m$--.

Column 6, lines 61-64, the left side of the equation which appears as "$w_m$" should read --$x_m$--.

Column 10, line 21, the term "PEOE" should read --PFOE--.

Column 10, line 37, the term "TEE" should read --TFE--.

Column 11, lines 58 through 64, in claim 1, delete "wherein said polymerized comonomer units are present in an amount from 0.01 mol % to 0.30 mol % based upon total copolymer composition, and said copolymer has a raw dispersion primary particle size (RDPS) less than 0.210 microns and has a standard specific gravity (SSG) of less than 2.143".

Column 12, lines 52, 55, 57, 60 and 63, the claim reference numeral "1", at each occurrence, should read --8--.

Signed and Sealed this

Thirtieth Day of June, 2009

JOHN DOLL
*Acting Director of the United States Patent and Trademark Office*